(12) United States Patent
Nakamoto

(10) Patent No.: US 8,737,840 B2
(45) Date of Patent: May 27, 2014

(54) OPTICAL TRANSMISSION SYSTEM, TRANSMITTER, RECEIVER AND METHOD

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 13/046,876

(22) Filed: Mar. 14, 2011

(65) Prior Publication Data

US 2011/0268456 A1    Nov. 3, 2011

(30) Foreign Application Priority Data

Apr. 30, 2010  (JP) ................... 2010-105793

(51) Int. Cl.
*H04B 10/00* (2013.01)
*H04B 10/04* (2011.01)
*H04B 10/18* (2011.01)

(52) U.S. Cl.
USPC ........... 398/152; 398/156; 398/162; 398/140; 398/81

(58) Field of Classification Search
USPC ......................... 398/152, 156, 140
See application file for complete search history.

(56) References Cited

U.S. PATENT DOCUMENTS

| | | | |
|---|---|---|---|
| 6,046,839 A * | 4/2000 | Ito et al. .......... | 359/246 |
| 8,483,573 B2 | 7/2013 | Kotake et al. | |
| 2002/0191265 A1* | 12/2002 | LaGasse et al. ........ | 359/246 |
| 2003/0090768 A1* | 5/2003 | Liu et al. ............ | 359/183 |
| 2003/0175034 A1 | 9/2003 | Noe | |
| 2009/0147955 A1* | 6/2009 | Kim et al. ............ | 380/256 |
| 2009/0190930 A1* | 7/2009 | Von Der Weid ........ | 398/81 |
| 2010/0067914 A1 | 3/2010 | Tanaka et al. | |

FOREIGN PATENT DOCUMENTS

| | | |
|---|---|---|
| EP | 1679810 | 7/2006 |
| JP | 11-271698 | 10/1999 |
| JP | 2004-253931 | 9/2004 |
| JP | 2010-68235 | 3/2010 |
| JP | 2011-155579 | 8/2011 |
| WO | WO 2005/086391 | 9/2005 |
| WO | WO 2007/073586 | 7/2007 |

OTHER PUBLICATIONS

European Patent Office Search Report dated Sep. 28, 2011 for corresponding European Patent Application No. 11158644.2.
Park, et al., "PMD-Induced Crosstalk in the Presence of Polarization Scrambling", IEEE Photonics Technology Letters, vol. 16, No. 11, pp. 2580-2582, Nov. 1, 2004.
Notice of Rejection for Japanese Application No. 2010-105793 dated Jan. 7, 2014.

* cited by examiner

*Primary Examiner* — Oommen Jacob

(74) *Attorney, Agent, or Firm* — Staas & Halsey LLP

(57) ABSTRACT

In the optical transmitting system, the optical transmitter transmits a polarization combined signal light obtained by combining a pair of lights having different polarization orientation, and the optical receiver separates the combined signal light. In the optical transmitter, a polarization changer changes a state of polarization of the polarization combined signal light. In the optical receiver, a polarization reverse-changer changes the state of the polarization combined signal light in a reverse direction of the change that polarization changer applies.

10 Claims, 11 Drawing Sheets

OPTICAL TRANSMISSION SYSTEM, TRANSMITTER, RECEIVER AND METHOD

CROSS-REFERENCE TO RELATED APPLICATION

This application is based upon and claims the benefit of priority of the prior Japanese Patent Application No. 2010-105793, filed on Apr. 30, 2010, the entire contents of which are incorporated herein by reference.

FIELD

The embodiments disclosed herein are related to an optical transmission system, an optical transmitter, an optical receiver, and a method for optical transmission, adopting polarization multiplexing.

BACKGROUND

A recent long-distance optical transmission system used for high-speed large-capacity data transmission adopts a Wavelength Division Multiplex (WDM) method, in which a number of optical signals are multiplexed on a single transmission path. In WDM communication, optical lights having different wavelengths are simultaneously transmitted.

Besides, there is proposed a method of polarization multiplexing communication in which polarizations having different polarization orientations are multiplexed (e.g., see Japanese Laid-open Patent Publication No. 2010-068235). Polarization multiplexing communication maintains multiplicity of horizontal polarization and vertical polarization, keeping each individual orientation, so that an amount of information transmitted via an optical signal of a single wavelength light becomes twice. In other words, application of the optical polarization multiplexing technique to optical signals of respective wavelength lights to be transmitted optical wavelength multiplexing communication can increase an amount of communicable information per wavelength. Thereby, the transmission capacity per fiber can be increased.

A polarization multiplexed signal conforming to the polarization multiplexing communication is demultiplexed by, for example, adaptive polarization demultiplexing signal processing using analog/digital conversion or digital signal processing conforming to digital coherent method. Adaptive polarization demultiplexing signal processing adaptively estimates a property of polarization of a receiving signal and demodulates polarization multiplexed signal in a digital circuit. Specific demodulation methods are splitting of polarizations, equalizing of wavelength distortion, compensating for frequency offset, and controlling of the phase of a signal.

An optical signal is attenuated in proportion to a length that the signal travels through the transmission path. That is, in transmission through a long-distance transmission path such as a submarine cable, an optical signal is largely attenuated. Amplification on the transmission path is effectual to keep signal intensity. For this purpose, a number of optical amplifiers are serially interposed into a transmission path in a conventional long-distance optical transmission system.

However, connection of multiple optical amplifiers result in lowering signal quality. In particular, Polarization Hole Burning (PHB) causes each optical amplifier to have a Polarization Dependent Gain (PDG). Consequently, spontaneous emission light serving as a noise component in an optical amplifier increases in relation to the gain so that the signal-to-noise (SN) ratio of an optical signal output from the optical amplifier lowers.

The intensity of a signal output from an optical amplifier have a Polarization Dependent Loss (PDL) slightly related to the polarization of the optical signal. In the meantime, the noise component in the form of spontaneous emission light is not polarized. Therefore, the ratio of noise in an optical signal relatively increases at the downstream part of an optical amplifier, and accordingly, the SN ratio further lowers. The noise component is accumulated each time an optical signal passes through an optical amplifier and therefore the SN ratio lowers each time the optical signal passes through an amplifier.

In the above polarization multiplexing communication, optical signals of respective different wavelengths do not interfere with one another and are multiplexed into a polarization multiplexed signal, which scarcely causes PHB. However, PDL of each optical device disposed on the transmission path may increase variation in optical power of respective polarization different in polarization orientation and consequently PHB may occur.

In order to avoid influence caused by PHB and PDL, Polarization Scrambling technique is known which polarization is forcibly modulated when the corresponding optical signal is to be transmitted (see, for example, Japanese Laid-open Patent Publication No. 11-271698). This technique obtains the similar effects as non-polarized light through randomly varying the state of polarization of an optical signal and is effective in improving an SN ratio of an optical signal.

In polarization scrambling, a lower frequency of modulating polarization results in higher digital error rate penalty. Generally, a modulation frequency set to be 10 kHz or less than 10 kHz causes the optical intensity to deviate at a frequency of 10 kHz or less than 10 kHz due to PDL. Furthermore, modulation of a gain resulting from the frequency response property of an optical modulator leads to a larger intensity modulation, which greatly impairs the signal quality. For this reason, when polarization scrambling is carried out on an optical transmission path, the polarization is preferably modulated at a frequency of several hundreds or more.

However, in applying adaptive polarization demultiplexing signal processing conforming to a digital coherent method to the above polarization multiplexing communication, hardware restriction of a digital circuit makes it difficult to increase the modulation frequency in polarization scrambling.

Accordingly, in a long-distance optical transmission system mounting adaptive polarization splitting signals processing conforming to a digital coherent method, polarization scrambling is carried out at relatively low modulation frequency so that there is difficulty in improving transmission quality. Other long-distance transmission systems have the similar problem.

SUMMARY

There is disclosed an optical transmission system including an optical transmitter that combines first signal light and second signal light having different polarization orientations to generate a combined signal light and outputs the combined signal light to a transmission path; and an optical receiver that separates the combined signal light input from the optical transmitter via the transmission path into the first signal light and the second signal light.

The optical transmitter includes a polarization changer that temporarily changes a state of polarization of the combined signal light. The optical receiver includes a polarization reverse-changer that changes the state of polarization of the combined signal light in a reverse direction of the change that the polarization changer applies.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the embodiments.

1. Configuration

Figure 1:
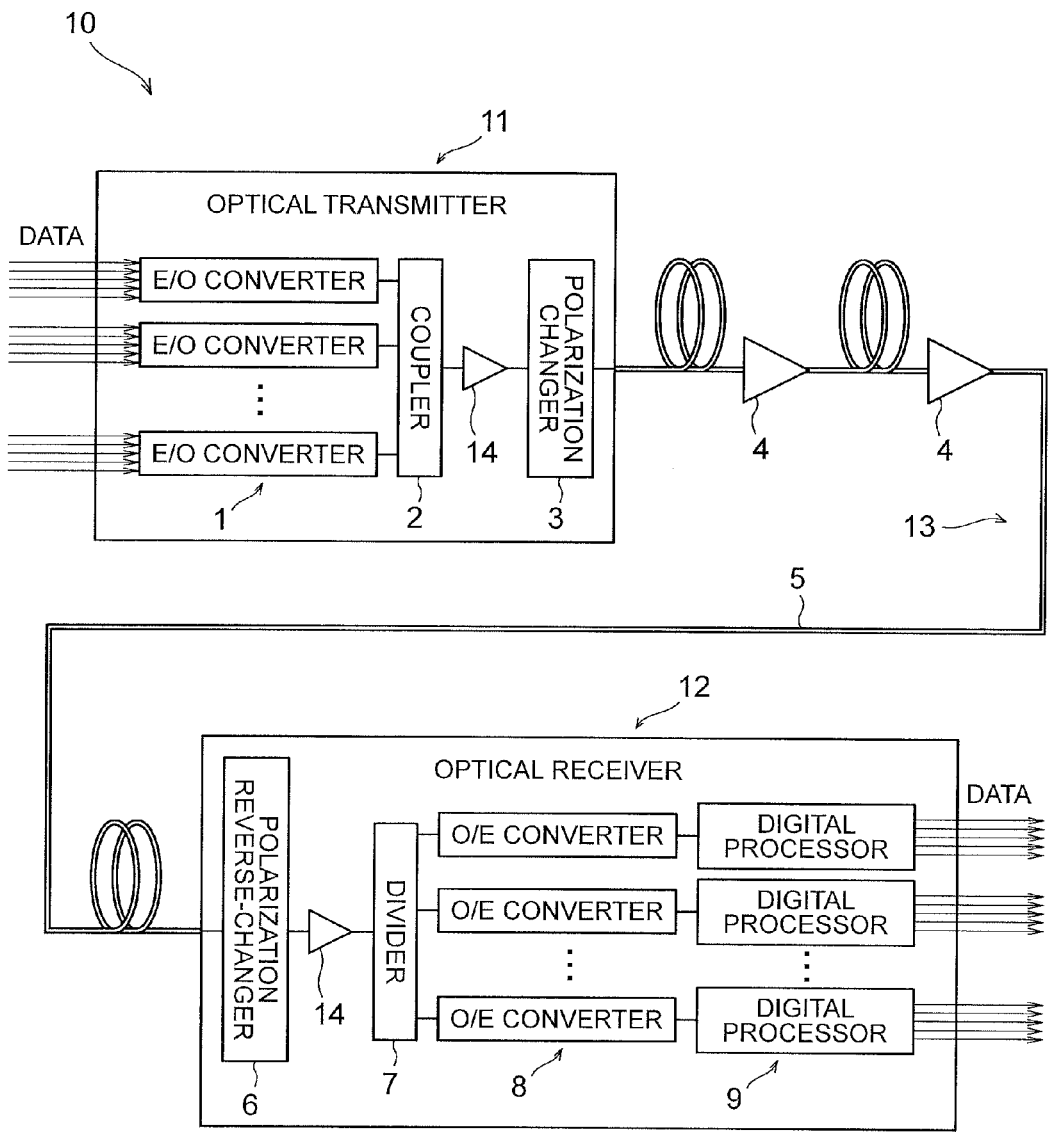
FIG. 1 is an example block diagram schematically illustrating an optical transmission system, an optical transmitter, and an optical receiver according to a first embodiment.

FIG. 1 illustrates an example of an optical transmission system 10 of the first embodiment. The optical transmission system 10 is a transmission system that adopts Polarization Multiplexing that multiplexes polarization of optical signals by long-distance Wavelength Division Multiplex (WDM) method. The optical transmission system 10 includes an optical transmitter 11 (optical transmitter means), an optical receiver 12 (optical receiver means), and a transmission path 13 that couples the optical transmitter 11 and the optical receiver 12. The transmission path 13 includes a number of optical relays 4 and an optical cable 5.

Each optical relay 4 is an amplifier that does not convert an optical signal into an electric signal, but does directly amplify a signal in a state of an optical signal. An optical signal to be transmitted in the optical transmission system 10 includes an FEC (Forward Error Correction) frame to record a parity for error correction (i.e., an error correction digit).

1.1 Optical Transmitter

An optical transmitter 11 includes a number of electro-optic convertors 1 (E/O units) each of which functions as an optical transmitting unit, a coupler 2 (coupler means), a polarization changer (polarization changer means) 3, and an amplifier 14.

Figure 2:
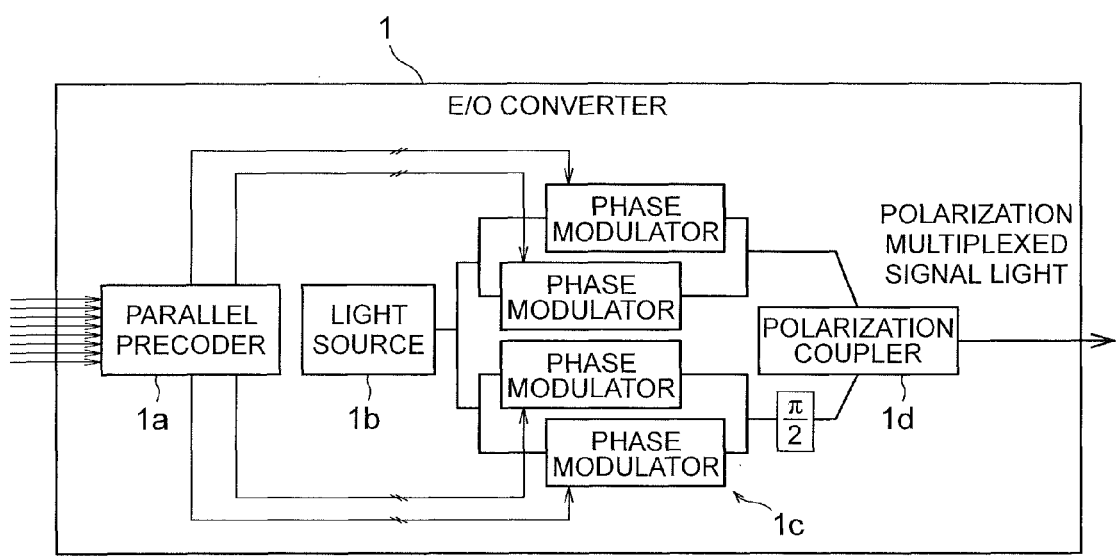
FIG. 2 is a block diagram schematically illustrating an example of an electro-optic convertor (optical transmitting unit, E/O unit) of FIG. 1.

Each electro-optic convertor 1 outputs an optical signal modulated on the basis of an electric signal provided from an external unit or the like. The number of electro-optic convertors 1 corresponds to the number of wavelength channels that the optical transmitter 11 uses, and the respective electro-optic convertors 1 output optical signals having different wavelengths (frequencies). As illustrated in FIG. 2, each electro-optic convertor 1 includes a parallel precoder 1a, a light source 1b, a number of phase modulators 1c, and a polarization coupler 1d (polarization coupler means).

The parallel precoder 1a has a converting circuit that generates a modulated signal in conformity with a predetermined modulation method on the basis of an electric signal provided from an external unit or the like. A predetermined modulation method corresponds to the modulation method of an optical signal to be output from the optical transmitter 11. The parallel precoder 1a sends the generated modulation signal to the phase modulators 1c.

Examples of the modulation method of optical signals are a coherent reception modulation method of QPSK (Quadrature Phase Shift Keying) and BPSK (Binary Phase Shift Keying). Alternatively, RZ (Return-to-Zero) intensity modulation can be imposed on each polarization wave; specifically, the polarization wave is combined such that the peaks of RZ intensity signals are in-phase (aligned polarization) or the peak and the trough are in-phase (interleaved polarization). Further alternatively, QAM (Quadrature Amplitude Modulation) that is the combination of the above phase modulation method and the intensity modulation method can be applied.

Examples of the light source 1b are a mode-locked semiconductor laser and a variable-wavelength semiconductor laser diode (LD). The light source 1b inputs an optical signal having a predetermined wavelength into the respective phase modulators 1c.

In the example of FIG. 2, the light source 1b emits coherent light having a constant phase and therefore outputs an optical signal linearly polarized light. The wavelength of the emitted light is one of the unit wavelengths of Wavelength Division Multiplex (WDM). The light sources 1b provided one for each electro-optic convertor 1 emit light having different wavelengths.

Each phase modulator 1c applies phase modulation to the optical signal from the light source 1b on the basis of the modulation signal from the parallel precoder 1a. For example, application of a voltage corresponding to the modulation signal to a dielectric crystal on an optical waveguide varies the refractive index of the crystal and thereby delays the phase of the optical signal passed through the dielectric crystal. The amount of variation in the refractive index of the dielectric crystal is proportional to the magnitude of the applied voltage. The respective phase modulators 1c input the optical signals into the polarization coupler 1d.

In the example of FIG. 2, each phase modulator 1c controls the phases of both optical signals (x-polarization wave and y-polarization wave) such that the polarized state of one optical signal (x-polarization wave) and that of the other optical signal (x-polarization wave) are multiplexed. On the x-polarization wave and the y-polarization wave, information corresponding to different electric signal provided to the parallel precoder 1a is imposed. In other words, each phase modulator 1c has a function as polarization multiplexing means that imposes two polarization waves onto one optical signal having a constant wavelength.

The four phase modulators 1c carry out IQ modulations on x-polarization wave and y-polarization wave. Specifically, the phase modulators 1c apply phase modulation (PM) to the x-polarization wave and the y-polarization wave into the I (In-phase) components and the Q (Quadrature-phase) component.

The modulation on the above polarization components can be accomplished by various modulation methods (e.g., amplitude modulation (AM) and frequency modulation (FM)). Here, modulations to two polarization components are carried out in units of data series independently of each other, so that the bit rate per wavelength can double.

The polarization coupler 1d combines the optical signals modulated by the phase modulators 1c to obtain a polarization combined signal light, which is then output to the downstream coupler 2. The polarization coupler 1d combines optical signals input from the respective phase modulators 1c. That is, pairs of optical lights having different polarization orientations are overlapped each other. An example of the polarization coupler 1d is a Polarization Beam Combiner (PBC).

The coupler 2 multiplexes polarization combined signal light from the respective electro-optic convertors 1 to generate a multiplexed signal beam. In the coupler 2, optical signal having different wavelength are multiplexed and a multiplexed signal light having a multiplexed optical wavelength is output. When the Wavelength Division Multiplex (WDM) is not adopted, the optical transmitter 11 satisfactorily includes at least one electro-optic convertor 1. In this case, the coupler 2 is omissible.

The amplifier 14 amplifies a signal beam output from the coupler 2. The amplified signal beam is input into the polarization changer 3.

Figure 3A:
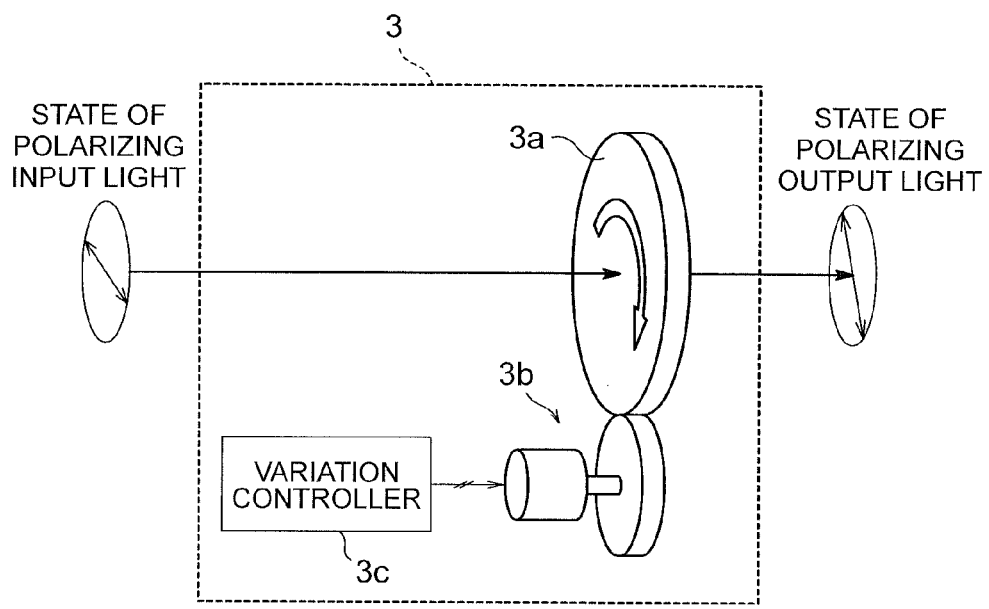
FIG. 3A is a schematic diagram illustrating an example of a polarization changer of FIG. 1.

The polarization changer 3 temporarily (continuously) changes (varies) the state of polarization of the multiplexed signal beam from the amplifier 14 within a plane perpendicular to the direction in which the beam travels and outputs the multiplexed signal beam to the transmission path 13. As illustrated in FIG. 3A, the polarization changer 3 includes, for example, a half-wave plate 3a, a driving unit 3b, and a variation controller 3c.

The half-wave plate 3a is a birefringence device that applies a phase difference π (pi) between the perpendicular polarized components. Specifically, the half-wave plate 3a provides a phase difference π, among electric-field vectors of input light, between an electric-field component parallel with the crystalline principal axis and an electric-field component perpendicular to the crystalline principal axis, and concurrently transmits the input light. The crystalline principal axis (the fast axis and the slow axis) of the half-wave plate 3a is parallel to the input plane. The input plane of the half-wave plate 3a is substantially perpendicular to the direction that the input light from the amplifier 14 travels. The direction in which the input light travels does not have to always coincide with the direction of the normal of the input plane of the half-wave plate 3a.

Assuming that the principal axis of polarized light input into the half-wave plate 3a and the principal axis of the half-wave plate 3a form an azimuth, the half-wave plate 3a converts the principal axis of the polarized light to the twice the azimuth and outputs the converted polarized light. Therefore, varying the azimuth can vary the plane of polarization.

One of the important functions for the half-wave plate 3a is to vary the plane of polarization of input light. Accordingly, a quarter-wave plate can be used in addition to the half-wave plate 3a.

The driving unit 3b drives the half-wave plate 3a in the direction of the input plane thereof through the use of a power source such as a motor or an actuator. The driving unit 3b continuously changes the half-wave plate 3a at a predetermined first variation frequency (e.g., 200 kHz or more), which frequency does not have to be constant.

The variation controller 3c is exemplified by an LSI device that integrates a microprocessor, a ROM, a RAM, and others, and controls the driving unit 3b such that the variation frequency (e.g. angular velocity) of the half-wave plate 3a is constant. Alternatively, the driving unit 3b may be controlled by storing software in a non-illustrated memory and reading the software by a non-illustrated CPU when occasion arises.

The state of polarization of a multiplexed signal beam from the amplifier 14 changes within a plane perpendicular to the direction in which the multiplexed signal beam travels when the multiplexed signal beam is passing through the polarization changer 3. The angular velocity of the plane of polarization of the multiplexed signal beam (i.e., a plane perpendicular to the plane of the vibration plane of an electric-field vector component) is twice the angular velocity of the half-wave plate 3a.

Figure 4:
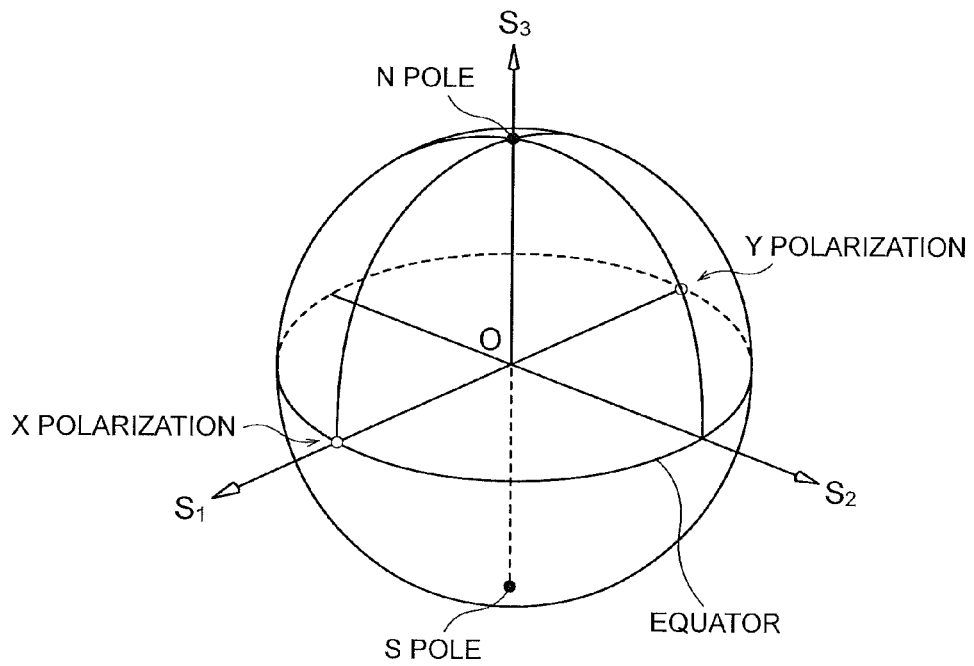
FIG. 4 is a Poincaré sphere diagram explaining varying operation by the polarization changer and the polarization reverse-changer of FIG. 1.

As illustrated in FIG. 4, the varying operation (e.g. rotating operation) by the polarization changer 3 changes the state of polarization of the multiplexed signal beam around a straight line passing through the N pole and the S pole of the Poincaré sphere serving as the axis. Specifically, the N pole and the S pole of the Poincaré sphere corresponds to points at which Stokes parameter $S_3$ takes values of 1 and −1, respectively, on a sphere having a center corresponding to the origin of the Stokes coordinate and having a radius of 1.

In other words, multiplexed signal beam in the form of linearly polarized wave moves in parallel to the equator of the Poincaré sphere. The x-polarization and the y-polarization of polarization combined signal light having an arbitrary wavelength which polarizations are perpendicular to each other are disposed substantially symmetric with respect to the center point of the Poincaré sphere. Consequently, the varying operation in the polarization changer 3 maintains perpendicularity of the x-polarization and the y-polarization.

The direction of change of the state of polarization expressed on the Poincaré sphere is not limited to the direction of the rotation on the $S_3$ axis of the Stokes space. Alternatively, if a quarter-wave plate is used in addition to the half-wave plate 3a, the x-polarization and the y-polarization, being disposed substantially symmetrically with respect to the center point of the Poincaré sphere, move to points deviated from the equator (i.e., move to points at which the Stokes parameter $S_3$ does not take a value of 0). Namely, the locus of movement (trajectory) of a polarization can be any points on the Poincaré which are not limited to points of the equator.

Alternatively, movement of the state of polarization may be expressed by a combination of three kinds of rotation respectively around the $S_1$ axis, the $S_2$ axis, and the $S_3$ axis. Namely, "change" to be applied to the state of polarization of the multiplexed signal beam by the polarization changer 3 can be regarded as a change caused by combining rotations respectively around the $S_1$ axis, the $S_2$ axis, and the $S_3$ axis of the Stokes space.

1-2. Optical Receiver

The optical receiver 12 includes a polarization reverse-changer 6 (polarization reverse-changer means), a divider 7 (divider means), a number of optic-electro convertors (O/E units) 8 each of which functions as an optical receiving unit, a digital processor 9 (digital processor means), and amplifier 14.

Figure 3B:
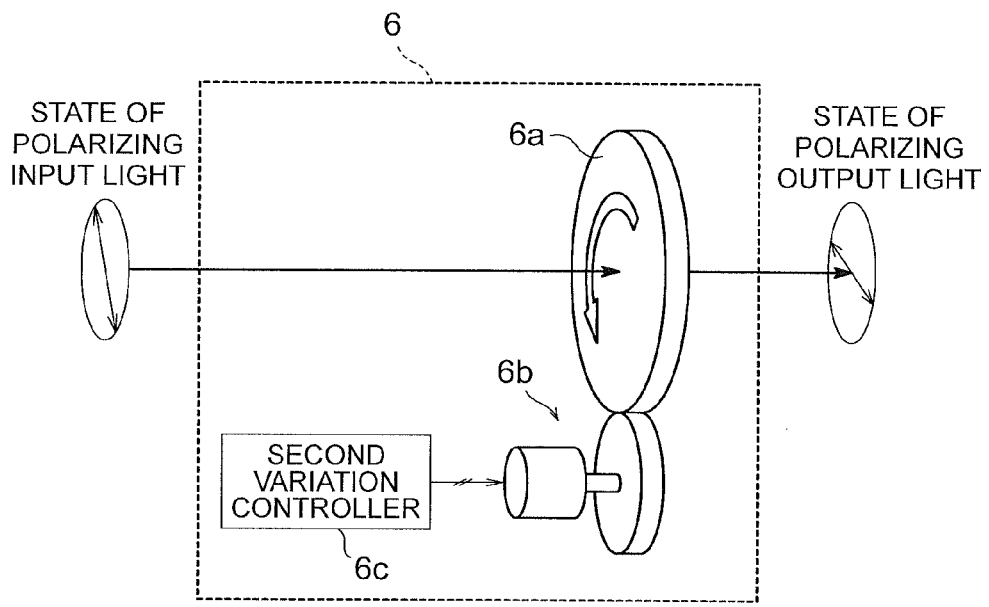
FIG. 3B is a schematic diagram illustrating an example of a polarization reverse-changer of FIG. 1.

The polarization reverse-changer 6 carries out reverse optical processing of the processing of the polarization changer 3. Specifically, the polarization reverse-changer 6 changes the state of polarization of multiplexed signal beam input through the transmission path 13 within a plane perpendicular to the direction in which the multiplexed signal beam travels in a reverse direction of the change that the polarization changer 3 applies. As illustrated in FIG. 3B, the polarization reverse-changer 6 includes, for example, a second half-wave plate 6a, a second driving unit 6b, and a second variation controller 6c.

The second half-wave plate 6a is a birefringence device that applies a phase difference π between the perpendicular polarized components similarly to the half-wave plate 3a.

The second driving unit 6b that, similarly to the driving unit 3b, continuously drives the half-wave plate 3a in the direction of the input plane thereof. The direction of varying the state of polarization of the multiplexed signal beam by the second driving unit 6b is opposite to the direction of change by the driving unit 3b.

The variation frequency by the second driving unit 6b is called a second variation frequency. For example, the second variation frequency is set to be the same as that of the driving unit 3b. Otherwise, the second variation frequency at the second driving unit 6b is set to have a difference of 20 kHz or less from the frequency at the driving unit 3b. The difference 20 kHz is identical to the upper limit that the signal processing ability of a digital processor 9 to be detailed below.

The varying operation by the polarization reverse-changer 6 inhibits (puts a brake on) the change (e.g. movement, rotation) that the polarization changer 3 applies to the state of polarization on the Poincaré sphere. If the difference in frequency of varying between the driving unit 3b and the second driving unit 6b is zero, the change that the polarization changer 3 applies to the state of polarization is cancelled and the state of polarization of the multiplexed signal beam returns to the state before the plane of polarization starts the change.

Similarly to the variation controller 3c, the second variation controller 6c is exemplified by an LSI device that integrates a microprocessor, a ROM, a RAM, and others, and controls the second driving unit 6b such that the variation frequency of the second half-wave plate 6a is constant.

The amplifier 14 amplifies the multiplexed signal beam output from the polarization reverse-changer 6. The amplified multiplexed signal beam is input into the divider 7.

The divider 7 demultiplexes the multiplexed signal beam in which optical lights having different wavelength are multiplexed into optical signal for respective wavelength channel. Each signal light divided by the divider 7 can be regarded as polarization combined signal light. That is, each signal light includes a pair of signal lights having different polarization orientations. When Wavelength Division Multiplex (WDM) method is not adopted, the divider 7 may not be used.

Figure 5:
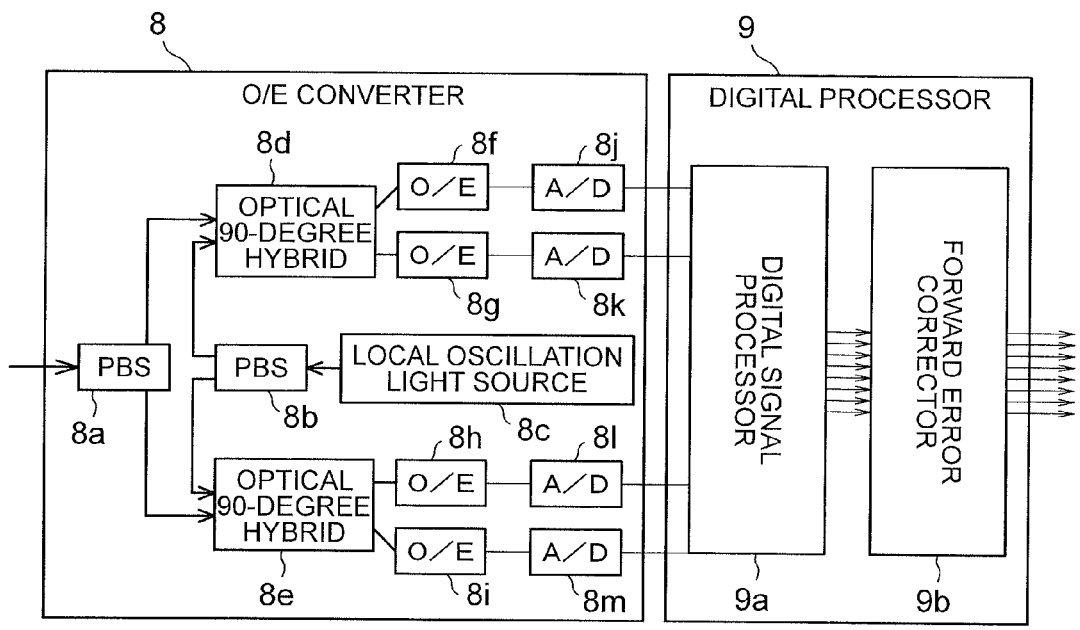
FIG. 5 is a block diagram schematically illustrating an example of an optic-electro convertor (optical receiving unit, O/E unit) of FIG. 1.

Each optic-electro convertor 8 converts an optical signal divided by the divider 7 into an electric signal. The number of optic-electro convertors 8 corresponds to the number of wavelength channels of the optical transmitter 11 (that is, the number of wavelength channels of the optical receiver 12). The optic-electro convertors 8 convert optical signals having respective different wavelengths (frequencies). As illustrated in FIG. 5, each optic-electro convertor 8 includes Polarization Beam Splitters (PBSs) 8a and 8b, a local oscillation light source 8c, optical 90-degree hybrids 8d and 8e, OE converters 8f-8i (O/E), and AD converters 8j-8m (A/D).

The polarization beam splitter 8a (polarization splitter means) receives a signal light from the divider 7 and separates (splits) the received signal light into two polarization components perpendicular to each other. Furthermore, the polarization beam splitter 8a introduces one of the polarized components to the optical 90-degree hybrid 8d and the other component to the optical 90-degree hybrid 8e. In the illustrated example, the x-polarization wave and the y-polarization wave generated by the phase modulator 1c of the electro-optic convertor 1 are input into one of the optical 90-degree hybrids 8d and 8e.

The local oscillation light source 8c is a light source that outputs local oscillation light that is to be used for optical detection carried out by the optical 90-degree hybrids 8d and 8e, and is exemplified by a DFB (Distributed Feedback) laser.

The polarization beam splitter 8b divides the local oscillation light from the local oscillation light source 8c into two perpendicular polarization components and introduces the polarized components one into each of the optical 90-degree hybrids 8d and 8e.

Each of the optical 90-degree hybrids 8d and 8e combines the polarization components from the polarization beam splitters 8a and 8b. A phase of the signal light from the local oscillation light source 8c is retarded by 90 degrees with the signal light from the polarization beam splitter 8a. Consequently, the optical 90-degree hybrids 8d and 8e each output optical detection light of the I component and the Q component. One optical 90-degree hybrid 8d outputs detected I component and detected Q component of the x-polarization wave while the other optical 90-degree hybrid 8e outputs detected I component and detected Q component of the y-polarization wave.

The OE convertors 8f-8i optic-electric convert lights having two polarized components of the I component and the Q component.

Specifically, the OE convertors 8f and 8g each convert one of the I component and the Q component from the optical 90-degree hybrid 8d into electric signals. In the same manner, the OE convertors 8h and 8i each convert one of the I component and the Q component from the optical 90-degree hybrid 8e into electric signals.

The AD convertors 8j-8m convert electric signals (analog signals) from the respective corresponding OE convertors 8f-8i into digital signals. The AD convertors 8j-8m are coupled to the respective corresponding OE convertors 8f-8i via AC coupling devices such as capacitors. The converted digital signals are input into the digital processor 9. The four digital signals output from the AD convertors 8j-8m correspond to detected outputs of the I components and the Q components of the x-polarization wave and the y-polarization wave.

The digital processors 9 are provided one for each of the optic-electro convertors 8. If a number of optic-electro convertors 8 are provided, the digital processor 9 identical to the number of optic-electro convertors 8 can be provided. Each digital processor 9 includes a digital signal processor 9a and a forward error corrector 9b.

Each digital signal processor 9a carries out adaptive polarization splitting signal processing of a digital coherent method on a digital signal input from the corresponding optic-electro convertor 8. Specifically, data transmitted on the x-polarization wave and data transmitted on the y-polarization wave are separated (split) from each other and are independently of each other demodulated through the use of the input digital signal. Then the digital signal processor 9a outputs demodulated data signals.

A specific demodulation method is equalization of waveform distortion, compensation for frequency offset, or control of the phase of a signal. A digital signal processor 9a can be realized by, for example, a Digital Signal Processor, a Field Programmable Gate Array, or an application specific LSI (Application Specific Integrated Circuit).

Each forward error corrector 9b refers to FEC frames included in a number of data signals output from the digital signal processor 9a, and carries out error correction on data, using a parity for error correction. Error correction processing includes, for example, calculation of the position and the size (corrected value) of an error or correction of an error symbol. In addition, the forward error corrector 9b can detect and count the number of pieces of digital error information related to found errors. The forward error corrector 9b transmits the data subjected to error correction processing to, for example, an external device.

2. Action and Effects

In the above optical transmission system 10, each electro-optic converter 1 performs polarization combination, and the polarization changer 3 continuously applies polarization change to the multiplexed signal beam after wavelength multiplexing by the coupler 2. The multiplexed signal beam to be output from the optical transmitter 11 is transmitted through the transmission path 13, always varying at the angular velocity that the polarization changer 3 applies.

For example, assuming that the driving unit 3b has a variation velocity (frequency) of 200 kHz, the multiplexed signal beam in the optical cable 5 has a velocity in polarization variation of 200 kHz within a plane perpendicular to the direction that the light travels. This means that the polarization state of the multiplexed signal beam changes along the equator or a parallel of the Poincaré sphere at 200 kHz.

Accordingly, outputting the multiplexed signal beam, varying the polarization orientation, to the transmission path can inhibit deterioration of the signal light during the transmission due to polarization dependent loss (PDL) and polarization hole burning (PHB). In other words, this can reduce influence of the polarization characteristics of the transmission path varying as time passes on the quality of receiving signal.

The light signal (multiplexed signal beam) received by the optical receiver 12 through the transmission path 13 is input into the polarization reverse-changer 6 before being input into the divider 7 and the optic-electro converters 8. The polarization reverse-changer 6 continuously applies, to the received signal light, polarization change in the reverse direction of that the polarization changer 3 applies.

Consequently, the polarization orientation of the multiplexed signal beam before being demultiplexed in the reverse direction changes in the reverse direction, so that the change that the polarization changer 3 applies can be reduced or cancelled and thereby the multiplexed signal beam can be divided into signal lights with ease.

The angular velocity of the multiplexed signal beam is based on the difference between the angular velocity that the polarization changer 3 applies and that the polarization reverse-changer 6 applies. Namely, a smaller difference between the angular velocity of the polarization changer 3 and that of the polarization reverse-changer 6 makes the angular velocity of the polarization plane of the signal light smaller, so that digital signal processor 9a can easily carry out signal processing.

Accordingly, since the first variation frequency and the second variation frequency can be flexibly set, depending on the capability of demodulating of the digital processor 9, the combination of these two frequencies can be determined, considering a state of transmission.

Here, the second variation frequency applied to the multiplexed signal beam by the second driving unit 6b is determined within the range not more than the upper limit of a frequency difference between the first variation frequency and the second variation frequency that the processing ability of each digital processor 9 allows. Accordingly, the respective digital processors 9 can carry out coherent reception without any problem and therefore the transmission quality of signal light can be improved.

Assuming that the variation frequencies of the driving unit 3b and the second driving unit 6b are both 200 kHz, the change applied by the polarization changer 3 is cancelled by the polarization reverse-changer 6, so that the multiplexed signal beam downstream of the polarization reverse-changer 6 has a velocity of the polarization change of zero, which means that the state of polarization of the multiplexed signal beam rests on the surface of the Poincaré sphere.

Consequently, the accuracy and the stability of the signal processing can be improving without hindering the signal processing capability of each digital processor 9.

The reverse change at the polarization reverse-changer 6 completely stops the change of the state of polarization, so that the previous change by the polarization changer 3 can be completely cancelled. Namely, since the accuracy in demultiplexing in the divider 7 can be improved, the transmission quality of the multiplexed signal beam can be further improved.

Furthermore, since the optical transmission system 10 realizes so-called polarization wave scrambling processing by means of optical change of a multiplexed signal beam, the optical transmission system 10 can advantageously have a simple configuration, with low cost to accomplish the embodiment.

3. Modification

Besides the above first embodiment, the embodiments can be carried out without departing from the gist of the present invention. The configurations and steps of the first embodiment can be selected, discarded, or combined according to a situation.

3-1. First Modification of Controlling by the Polarization Reverse-Changer 6

Figure 6:
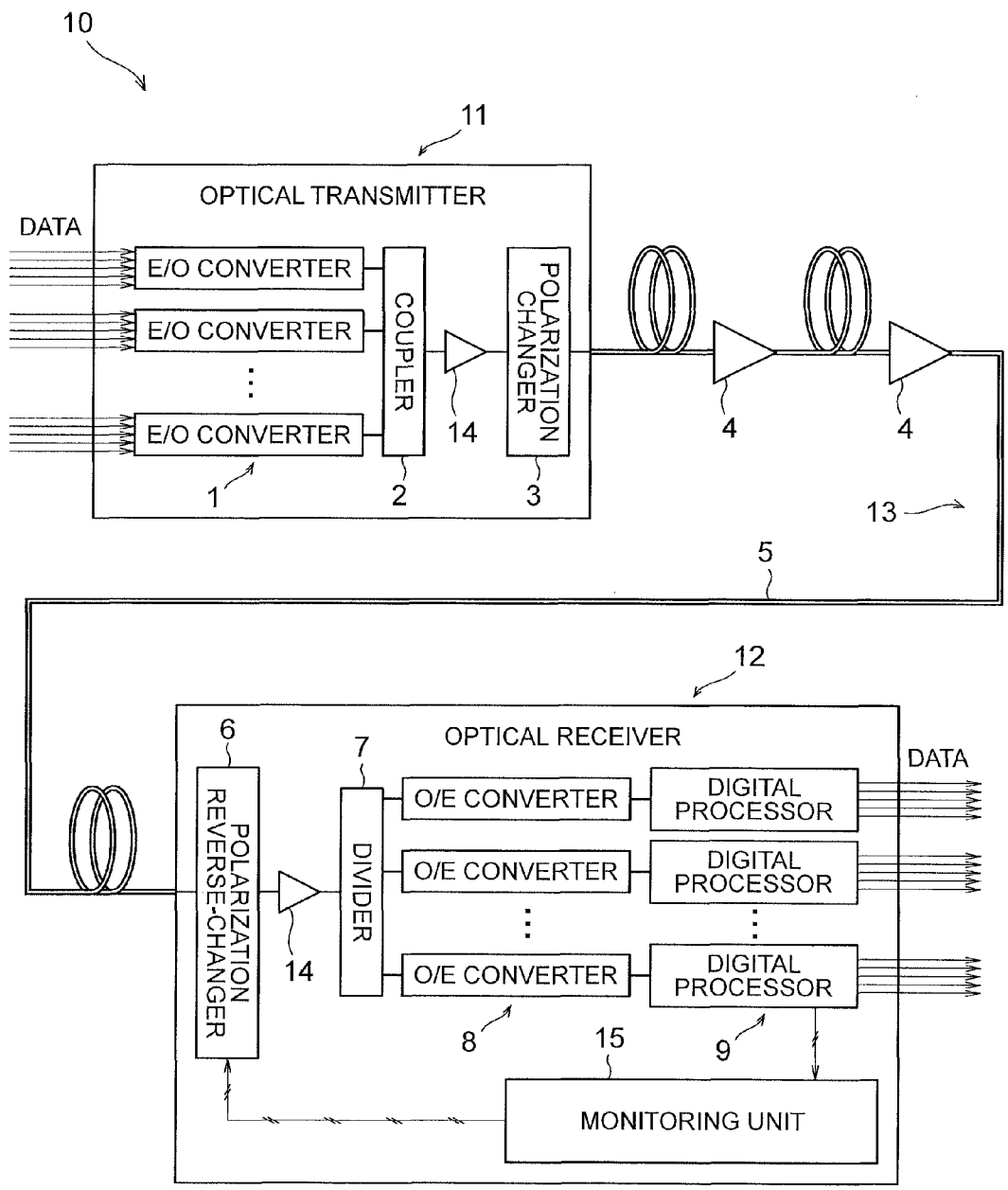
FIG. 6 is a block diagram schematically illustrating an optical transmission system according to a first modification.

FIG. 6 illustrates an optical transmission system 10 further includes a monitoring unit 15 (monitoring device, monitoring means) in the optical receiver 12 of the first embodiment. In FIG. 6, elements and parts represented by the same reference numbers as those of FIG. 1 represent the same elements and parts.

In the first modification, the monitoring unit 15 controls the polarization reverse-changer 6 on the basis of the error correction processing by the forward error corrector 9b. For example, the monitoring unit 15 outputs, to the variation controller 3c, a control signal based on the number of pieces of digital error information that the forward error corrector 9b detects in order to vary the second variation frequency.

Figure 7:
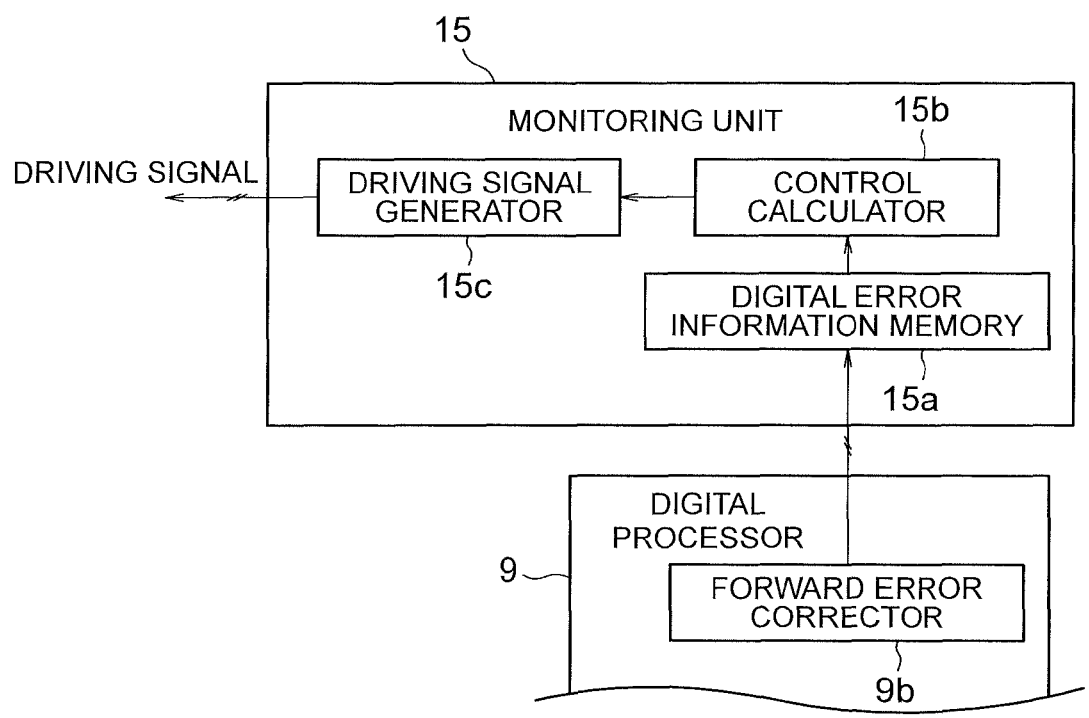
FIG. 7 is a block diagram schematically illustrating an example of a monitoring circuit of FIG. 6.

FIG. 7 illustrates an example of functions programmed in the form of software or a hardware circuit in the monitoring unit 15. The monitoring unit 15 can be exemplified by an LSI device integrating microprocessors, ROMs and RAMs. If the monitoring unit 15 is realized by software, the software is recorded in a non-illustrated storing device and read into a non-illustrated CPU as preferred, which realizes the following functions.

The monitoring unit 15 includes a digital error information memory 15a, a control calculator 15b, and the driving signal generator 15c.

The digital error information memory 15a receives information (e.g., the number or errors, the position of each error, the size of each error, and bit error rate) of digital error information detected by each forward error corrector 9b and stores the received information. The digital error information memory 15a stores the history of occurrence of digital error information.

The control calculator 15b determines the second variation frequency based on the digital error information stored in the digital error information memory 15a. Here, the first variation frequency and the second variation frequency respectively controlled by the polarization changer 3 and the polarization reverse-changer 6 are represented by F1 and F2, respectively, and the upper limit of the frequency difference that the signal processing ability of the digital processors 9 is represented by F0. The second variation frequency F2 determined by the control calculator 15b satisfies the relationship of $|F1-F2| \leq F0$. In other words, the range of variation of the second variation frequency is $F1-F0 \leq F2 \leq F1+F0$.

For example, the control calculator 15b gradually varies the second variation frequency F2 in the above controlling range and seeks the optimum value of the second variation frequency F2 at which the number of digital errors is less than the predetermined threshold. The control calculator 15b may bring the second variation frequency F2 near to the first variation frequency F1 in the above range when the number of digital errors is larger.

The driving signal generator 15c sends a driving signal corresponding to the second variation frequency F2 determined by the control calculator 15b to the second variation controller 6c. Upon receipt of the driving signal, the second variation controller 6c controls the second driving unit 6b such that the variation frequency of the second half-wave plate 6a comes to be equal to the second variation frequency F2 determined by the control calculator 15b.

Figure 8:
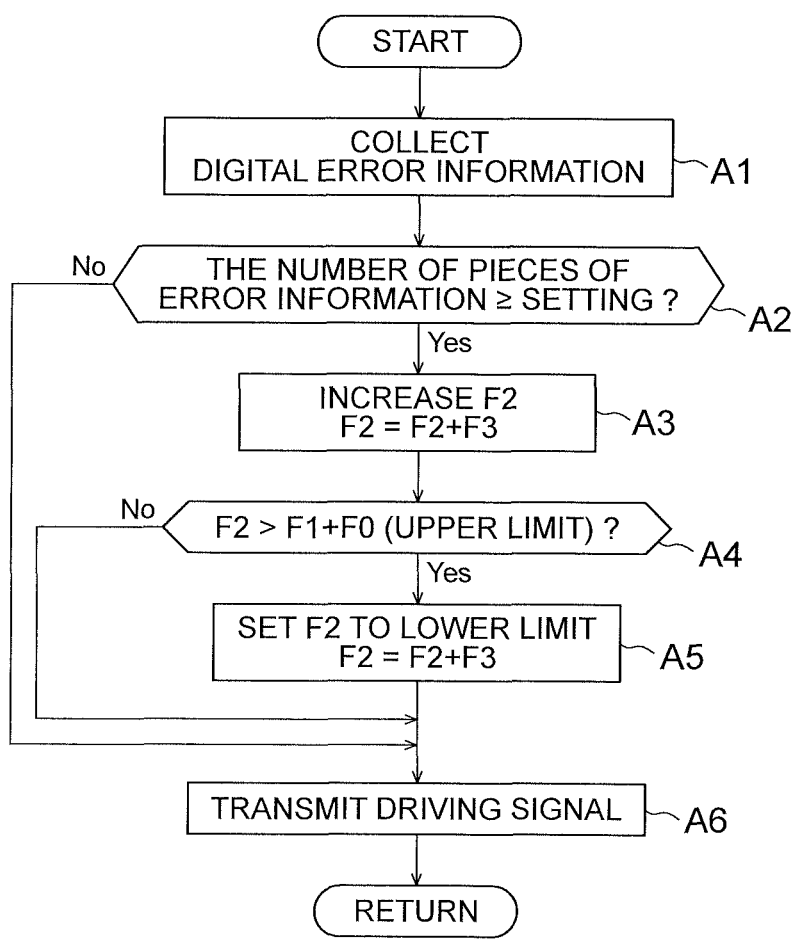
FIG. 8 is a flow diagram illustrating an example of a succession of the procedural steps of control carried out in the optical transmission system of FIG. 6.

FIG. 8 is a flow diagram illustrating an example of a succession of procedural steps of control based on the number of pieces of digital error information by the monitoring unit 15. The procedural steps are repeated at a predetermined cycle in the monitoring unit 15. In step A1, the digital error information detected by the forward error corrector 9b is input into the digital error information memory 15a, which accumulates the input information. In the ensuing step A2, the control calculator 15b counts the number of pieces of digital error information stored in the digital error information memory 15a. For example, the number of pieces of digital error information stored in a predetermined time period (the frequency of detecting digital error information) is judged.

Here, if the number of pieces of digital error information is the setting or more, the procedure proceeds to step A3 while the number is less than the setting, the procedure proceeds to step A6, where the driving signal generator 15c sends a driving signal corresponding to the second variation frequency F2 to the second variation controller 6c. Consequently the second half-wave plate 6a varies at the second variation frequency F2.

Step A3 adds a predetermined unit frequency F3 to the second variation frequency F2. The unit frequency F3 can take any value (e.g., 1 kHz). Namely, when the number of pieces of digital error information per unit time is the setting or less, the current second variation frequency F2 is maintained. In contrast, when the number of pieces of digital error information per unit time exceeds the setting, the second variation frequency F2 is updated.

In the next step A4, judgment is made whether or not the current second variation frequency F2 exceeds the upper limit F1+F0. If the current second variation frequency F2 exceeds the upper limit F1+F0, the procedure proceeds to step A5, where the second variation frequency F2 is set to be the lower limit F1-F0 and then the procedure proceeds to step A6. In contrast, if the current second variation frequency F2 is the upper limit F1+F0 or less, the procedure is proceeds to step A6 without any processing.

This control adds the unit frequency F3 to the second variation frequency F2 until the number of pieces of digital error information per unit time is setting or less. Specifically, the optimum second variation frequency is repeatedly sought within the range of $F1-F0 \leq F2 \leq F1+F0$. Consequently, the polarization reverse-changer 6 can be driven at the optimum second variation frequency F2 resulting in less pieces of digital error information. Specifically, the polarization reverse-changer 6 can be controlled such that the change can have the optimum frequency or amplitude resulting in less pieces of digital error information. This reduces the bit error rate, consequently improving the transmission quality.

Figure 9:
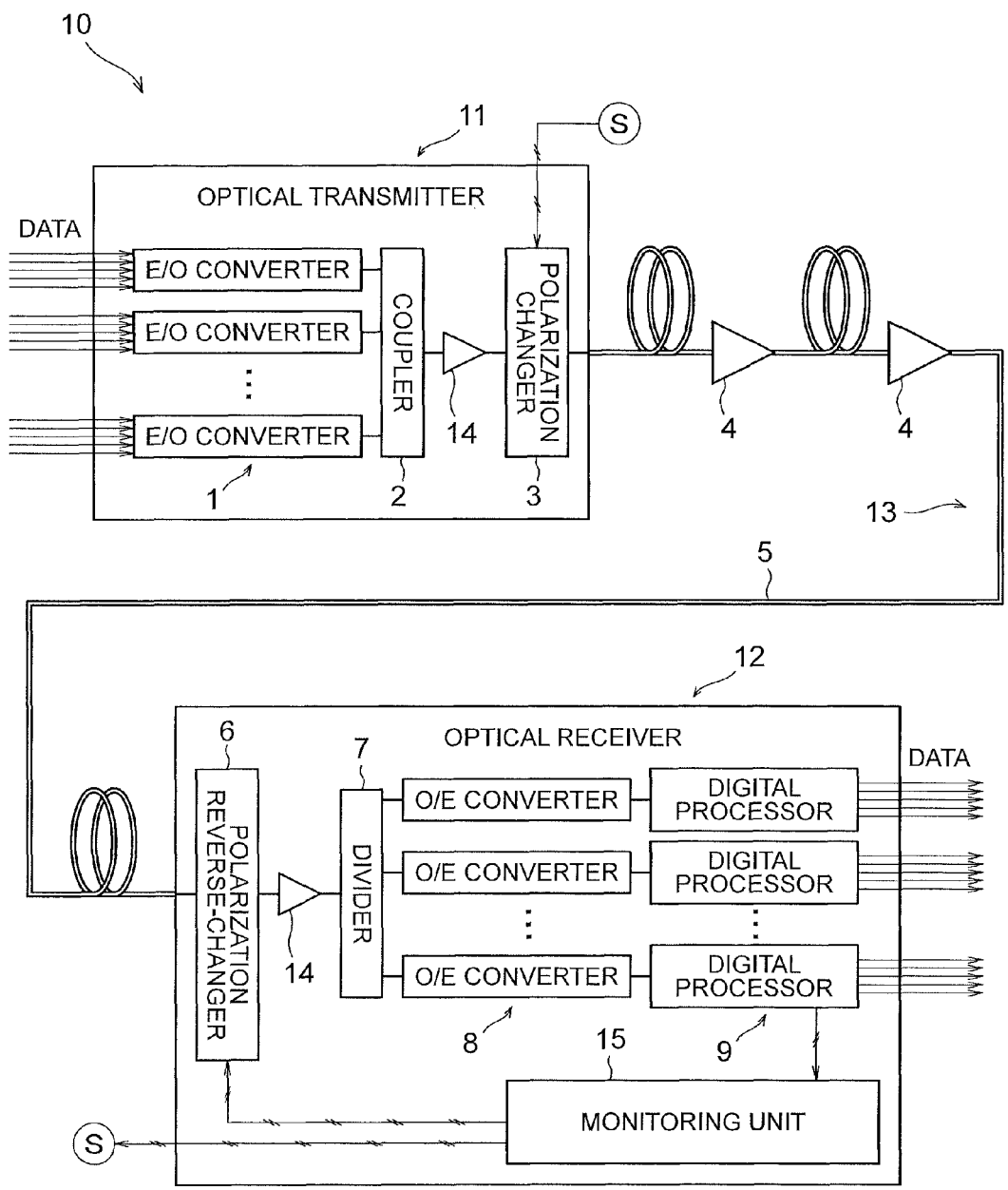
FIG. 9 is a block diagram schematically illustrating an optical transmission system according to a second modification.

3-2. Second Modification of Controlling of the Polarization Changer and Reverse-Changer FIG. 9 illustrates the optical transmission system 10 in which the monitoring unit 5 controls the polarization changer 3 on the basis of the error correction processing in the forward error corrector 9b in addition to the control of the above first modification. In FIG. 9, elements and parts represented by the same reference numbers as those of FIG. 1 represent the same elements and parts.

In the second modification, the first variation frequency F1 of the polarization changer 3 and the second variation frequency F2 of the polarization reverse-changer 6 are both controlled. For example, the range of variation of the first variation frequency F1 is expressed by $F4 \leq F1 \leq F4+F0$ based on a predetermined value F4. The range of variation of the second variation frequency F2 is expressed by $F5 \leq F2 \leq F5+F0$ based on the predetermined value F5.

Figure 10:
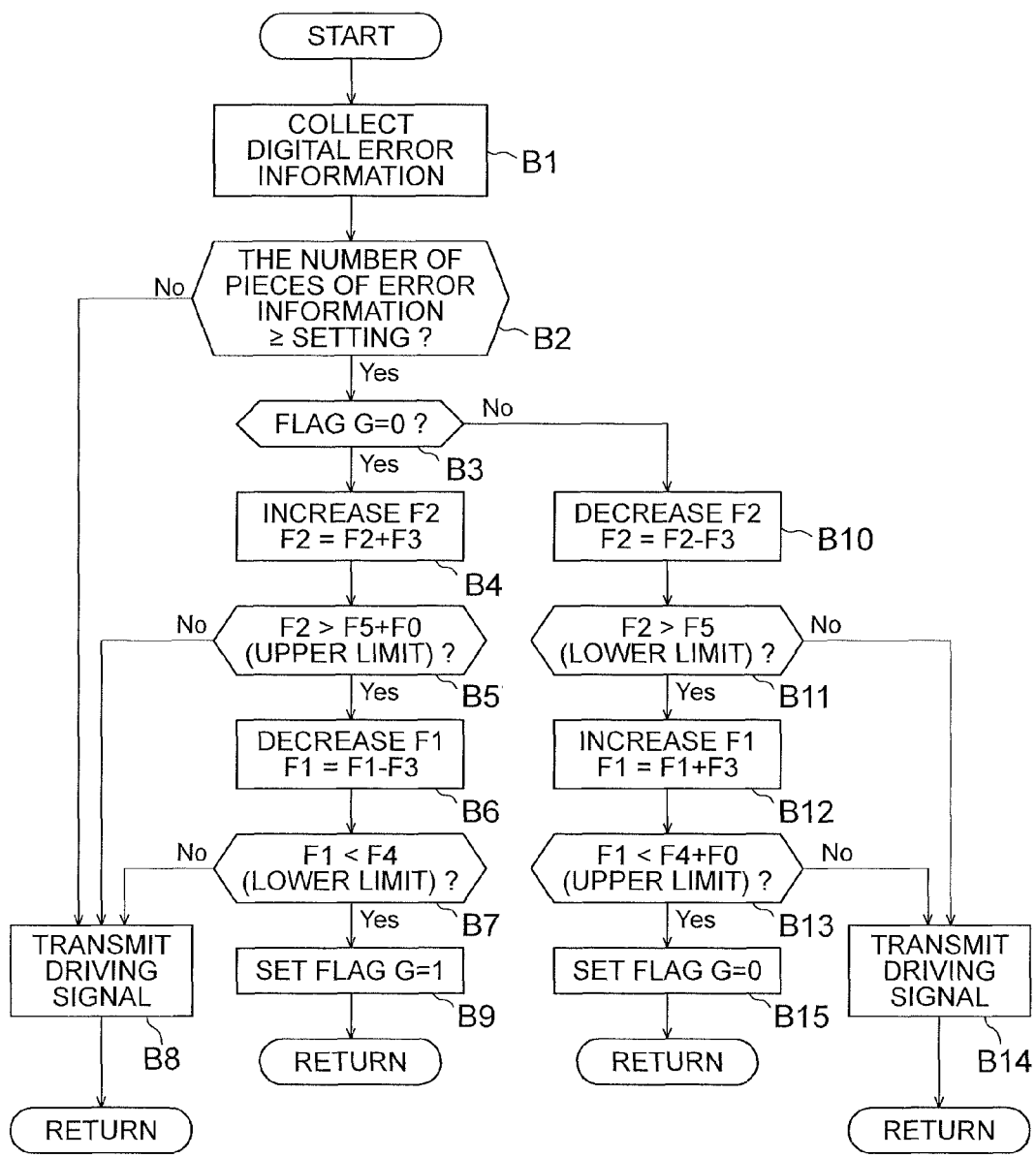
FIG. 10 is a flow diagram illustrating an example of a succession of the procedural steps of control carried out in the optical transmission system of FIG. 9.

FIG. 10 is a flow diagram illustrating an example of a succession of procedural steps of control by the monitoring unit 15 on the basis of the number of pieces of digital error information. The procedural steps are repeated at a predetermined cycle in the monitoring unit 15. The initial value of the first variation frequency F1 is F4+F0 (upper limit) and that of the second variation frequency F2 is F5 (lower limit). The procedural step uses a control flag G related to conditional judgment. The initial value of the control flag G is zero (0).

In step B1, the digital error information detected by the forward error corrector 9b is input into the digital error information memory 15a, which accumulates the input information. In the ensuing step B2, the control calculator 15b counts the number of pieces of digital error information stored in the control calculator 15b. For example, the number of pieces of digital error information stored in a predetermined time period (the frequency of detecting digital error information) is judged.

Here, if the number of pieces of digital error information is the setting or more, the procedure proceeds to step B3 while the number is less than the setting, the procedure proceeds to step B8, where the driving signal generator 15c sends a driving signal corresponding to the first variation frequency F1 to the polarization changer 3c and also sends a driving signal corresponding to the second variation frequency F2 to the second variation controller 6c. Consequently, the half-wave plate 3a varies at the first variation frequency F1 and the second half-wave plate 6a varies at the second variation frequency F2.

In step B3, a judgment is made whether the control flag G is equal to 0. Here, if G=0, the procedure proceeds to step B4 while if G≠0 (i.e., G=1), the procedure proceeds to step B10.

In step B4, a predetermined unit frequency F3 is added to the second variation frequency F2. The unit frequency F3 takes an arbitrary value (e.g., 1 kHz). Namely, when the number of pieces of digital error information per unit time is the setting or less, the current first variation frequency F1 and second variation frequency F2 are maintained. In contrast, when the number of pieces of digital error information per unit time exceeds the setting, the second variation frequency F2 is firstly increased.

In next step B5, a judgment is made whether the current second variation frequency F2 exceeds the upper limit F5+F0. Here, if the second variation frequency F2 exceeds the upper limit F5+F0, the procedure proceeds to step B6. In contrast, if the second variation frequency F2 is less than the upper limit F5+F0, the procedure proceeds to step B8.

In step B6, a predetermined unit frequency F3 is subtracted from the first variation frequency F1. The unit frequency F3 takes an arbitrary value (e.g. 1 kHz). The unit frequency F3 of the step B6 may be set to be a different value from that used in step B4. Since the second variation frequency F2 reaches the upper limit in step B4, the first variation frequency F1 is decreased.

In step B7, a judgment is made whether the first variation frequency F1 is less than the lower limit F4. If the first variation frequency F1 is not less than the lower limit F4, the procedure proceeds to step B8. In contrast, if the first variation frequency F1 is less than the lower limit F4, the procedure proceeds to step B9.

In step B9, the control flag G is set to be 1 (G=1). The control flag G is used for the conditional judgment in the above step B3. If the control flag G is set to be 1 when step B3 is carried out, the procedure proceeds to step B10.

In step B10, the unit frequency F3 is subtracted from the second variation frequency F2, that is, the second frequency F2 is reduced.

In ensuing step B11, a judgment is made whether the current second variation frequency F2 is less than the lower limit F5. If the second variation frequency F2 is less than the lower limit F5, the procedure proceeds to step B12. In contrast, the second variation frequency F2 is the lower limit F5 or more, the procedure proceeds to step B14. In step B12, the unit frequency F3 is added to the first variation frequency F1, that is, the first variation frequency F1 is increased.

In step B13, a judgment is made whether the first variation frequency F1 exceeds the upper limit F4+F0. If the first variation frequency F1 does not exceed the upper limit F4+F0, the procedure proceeds to step B14, where the driving signal generator 15c sends a driving signal corresponding to the first variation frequency F1 to the variation controller 3c and concurrently sends a driving signal corresponding to the second variation frequency F2 to the variation controller 3c. Thereby, the half-wave plate 3a varies at the first variation frequency F1 and the second half-wave plate 6a varies the second variation frequency F2.

On the contrary, the first variation frequency F1 exceeds the upper limit F4+F0 in step B13, the procedure proceeds to step B15, where the control flag is set to be 0 (G=0).

Figure 11:
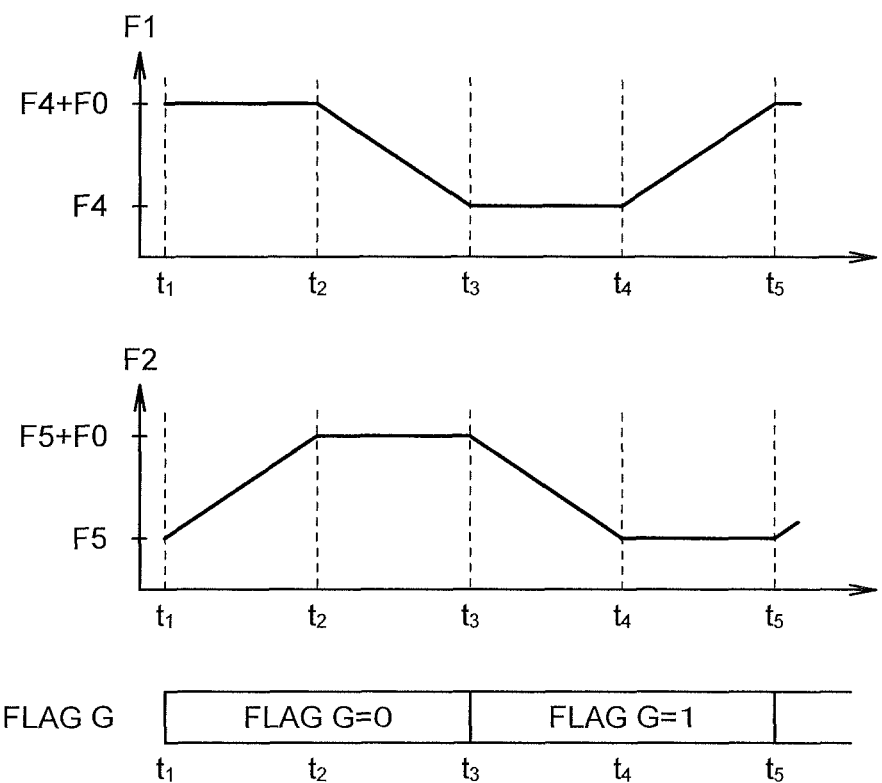
FIG. 11 is a time chart illustrating control carried out in the optical transmission system of FIG. 9.

FIG. 11 illustrates a time chart of variations in the first variation frequency F1 and the second variation frequency F2. The range of variation of the first variation frequency F1 is F4≤F1≤F4+F0 and that of the second variation frequency F2 is F5≤F2≤F5+F0. When the second variation frequency F2 is lower limit F5 or upper limit F5+F0, the first variation frequency F1 can take any value within the above variation range. Similarly, when the first variation frequency F1 is lower limit F4 or upper limit F4+F0, the second variation frequency F2 can take any value within the above variation range.

As the above, the optimum combination of the first variation frequency F1 and the second variation frequency F2 can be automatically and repeatedly retrieved from a variety of candidates. In other words, both polarization changer 3 and polarization reverse-changer 6 can be controlled such that an optical signal being transmitted has the optimum frequency or amplitude, which leads to less pieces of digital error information.

Consequently, the polarization changer 3 and the polarization reverse-changer 6 can be driven at the respective optimum frequencies resulting in less pieces of digital error information, so that the bit error rate can be lowered and the transmission quality can be improved.

3-3. Control Based on the Number of Errors Occurring at All the Channels

Figure 12:
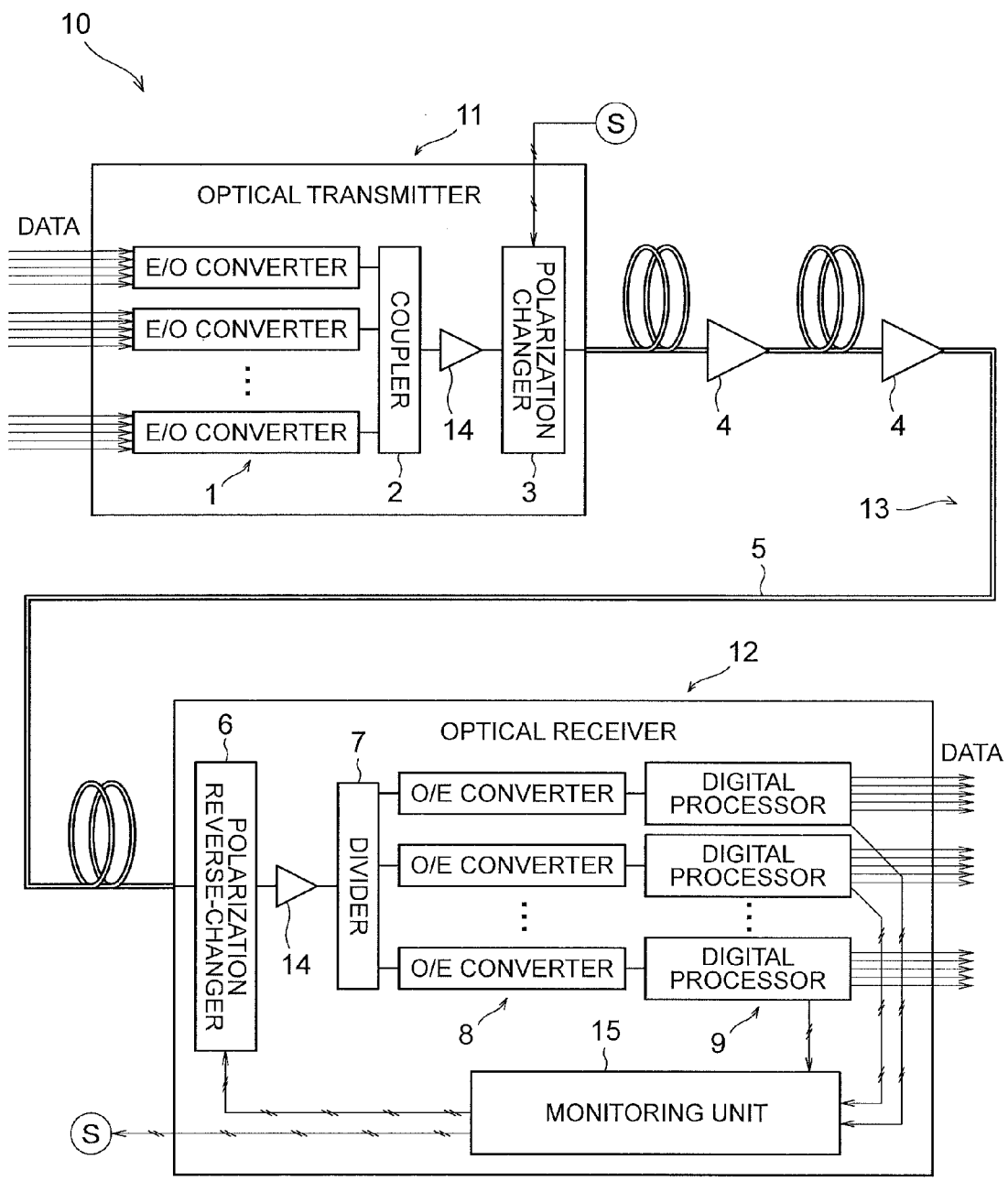
FIG. 12 is a block diagram schematically illustrating an optical transmission system according to a third modification.

FIG. 12 illustrates an optical transmission system in which the first variation frequency F1 and the second variation frequency F2 are controlled on the basis of the number of pieces of all digital error information detected in all the digital processors 9. In FIG. 12, elements and parts represented by the same reference numbers as those of FIG. 1 represent the same elements and parts. Digital error information detected in the forward error corrector 9b of each digital processor 9 represents that an error occurs on the wavelength channel demodulated by the corresponding optic-electro converter 8.

Accordingly, if the effects of polarization change by the polarization changer 3 and the polarization reverse-changer 6 depend on wavelength channels, digital error information is obtained from each of a number of wavelength channels, so that the polarization changing elements are optimally controlled on all the wavelength channels. Accordingly, this control can optimize the frequency or the amplitude of changes of the polarization changer 3 and the polarization reverse-changer 6 over a number of wavelength channels. Accordingly, the error bit rate can be improved and the transmission quality can be improved irrespective of kinds of wavelength channels.

3-4. Others

In the above embodiment and modifications, the optical transmission system mechanically varies the half-wave plate 3a and the second half-wave plate 6a. However, means to vary the plane of the polarization is not limited to that of the above. Alternatively, external force (e.g., tension) applied to the optical fiber through which the signal light after multiplexed propagates may cause minute double refraction so that the plane of polarization optimally changes.

In this case, a number of segments are provided each at which external force is applied to the optical fibers. This configuration can apply external force to the optical fiber from different direction along the stretching direction of the optical fiber, so that the polarization orientation can be changed.

The above optical transmission system is assumed to perform polarization multiplexed communication in conformity with a long-distance optical wavelength division multiplexing (WDM). An optical signal to be transmitted does not always have to be wavelength multiplexed. The optical signal to be transmitted satisfactorily is at least polarization combined, and undergoes polarization change after the combining and reverse polarization change before separating of polarization combined signal.

The technique disclosed the above can improve the transmission quality in a long-distance optical transmission system as compared with conventional techniques.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission system comprising; a digital processor; an optical transmitter that combines first signal light and second signal light having different polarization orientations to generate a transmission signal light and outputs the transmission signal light to a transmission path; and
   an optical receiver that separates the transmission signal light input from the optical transmitter via the transmission path into the first signal light and the second signal light,
   wherein the optical transmitter comprises a coupler that multiplexes polarization combined signal lights different in wavelength to generate a multiplexed signal beam and a polarization changer that continuously changes a state of polarization of the transmission signal light at a first variation frequency,
   wherein the optical receiver comprises a polarization reverse-changer that continuously changes the state of polarization of the transmission signal light at a second variation frequency in a reverse direction of the change that the polarization changer applies, and a divider that demultiplexes the multiplexed signal beam into the polarization combined signal lights different in wavelength,
   wherein the digital processor comprises a digital circuit that adaptively estimates a polarization property of the transmission path and demodulates the polarization combined signal lights demultiplexed in the divider, and
   wherein a difference between the first variation frequency of the polarization changer and the second variation frequency of the polarization reverse-changer is set to be not greater than a response frequency based on abilities of demodulation in the digital processor.

2. The optical transmission system according to claim 1, wherein further comprising a monitoring unit that controls a frequency or an amplitude of the change that the polarization reverse-changer applies on the basis of information of digital error of the transmission signal light separated in the optical receiver.

3. The optical transmission system according to claim 2, wherein the monitoring unit further controls the frequency or the amplitude of the change that the polarization changer applies on the basis of the information of the digital error of the transmission signal light separated in the optical receiver.

4. The optical transmission system according to claim 2, wherein the monitoring unit controls the frequency or the amplitude of each of the changes that the polarization changer and the polarization reverse-changer apply on the basis of information of digital error of the polarization combined signal lights demultiplexed in the divider.

5. The optical transmission system according to claim 1, wherein the difference between the first variation frequency and the second variation frequency is set to be zero.

6. An optical transmission system comprising:
   a digital processor;
   an optical transmitter comprising
      a polarization coupler which combines a pair of signal lights having different polarization orientations to generate a polarization combined signal light,
      a coupler that multiplexes polarization combined signal lights different in wavelength to generate a multiplexed signal beam, and
      a polarization changer that continuously changes, at a first variation frequency, a state of polarization of the multiplexed signal beam generated by the coupler within a plane perpendicular to a direction in which the multiplexed signal beam travels, and outputs the multiplexed signal beam to a transmission path; and
   an optical receiver comprising:
      a polarization reverse-changer continuously that changes, at a second variation frequency in the reverse direction of the change that the polarization changer applies, the state of polarization of the multiplexed signal beam within the plane perpendicular to the direction in which the multiplexed signal beam outputted by the polarization changer and that is input via the transmission path,
      a divider that demultiplexes the multiplexed signal beam after passing through the polarization reverse-changer into the polarization combined signal lights different in wavelength, and
      a polarization splitter which separates the polarization combined signal lights demultiplexed by the divider into the pair of signal lights,
   wherein the digital processor comprises a digital circuit that adaptively estimates a polarization property of the transmission path and demodulates the polarization combined signal lights demultiplexed in the divider; and
   wherein a difference between the first variation frequency of the polarization changer and the second variation frequency of the polarization reverse-changer is set to be equal to or less than a response frequency based on abilities of demodulation in the digital processor.

7. An optical transmitter used in an optical transmission system, the optical transmitter combining a pair of signal lights having different polarization orientations to generate a transmission signal light and outputs the transmission signal light to a transmission path, the optical transmission system also including an optical receiver that separates the transmission signal light input from the optical transmitter via the transmission path, the optical transmitter comprising:
   a coupler that multiplexes polarization combined signal lights different in wavelength to generate a multiplexed signal beam; and
   a polarization changer that continuously changes, at a first variation frequency, a state of polarization of the transmission signal light within a plane perpendicular to a direction in which the transmission signal light travels,
   the optical receiver comprising a polarization reverse-changer that continuously changes, at a second variation frequency, the state of polarization of the transmission signal light, and a divider that demultiplexes the multiplexed signal beam after passing through the polarization reverse-changer into the polarization combined signal lights different in wavelength, the optical transmission system further comprising a digital processor which comprises a digital circuit that adaptively estimates a polarization property of the transmission path and demodulates the polarization combined signal lights demultiplexed in the divider, and wherein a difference between the first variation frequency of the polarization changer and the second variation frequency of the polarization reverse-changer is set to be not greater than a response frequency based on abilities of demodulation in the digital processor.

8. An optical receiver used in an optical transmission system including an optical transmitter that combines a pair of signal lights having different polarization orientations to generate a transmission signal light, continuously changes a state of polarization of the transmission signal light at a first variation frequency, and outputs the transmission signal light to a transmission path, and the optical receiver that separates the transmission signal light input from the optical transmitter via the transmission path, the optical transmitter comprising a coupler that multiplexes polarization combined signal lights different in wavelength to generate a multiplexed signal beam, the optical receiver comprising:

a polarization reverse-changer that continuously changes the state of polarization of the transmission signal light within a plane perpendicular to a direction in which the transmission signal light travels at a second variation frequency in a reverse direction of the first change in the optical transmitter, and a divider that demultiplexes the multiplexed signal beam after passing through the polarization reverse-changer into the polarization combined signal lights different in wavelength, wherein the optical transmission system further comprises a digital processor which comprises a digital circuit that adaptively estimates a polarization property of the transmission path and demodulates the polarization combined signal lights demultiplexed in the divider, and wherein a difference between the first variation frequency and the second variation frequency is set to be not greater than a response frequency based on abilities of demodulation in the digital processor.

9. A method for optical transmission comprising:

at a transmitting end combining a pair of signal lights having different polarization orientations to generate a transmission signal light, multiplexing polarization combined signal lights different in wavelength to generate a multiplexed signal beam, changing, continuously at a first variation frequency, a state of polarization of the transmission signal light within a plane perpendicular to a direction in which the transmission signal light travels, and outputting the transmission signal light to a transmission path; and at an optical receiving end changing, continuously at a second variation frequency, the state of polarization of the combined signal beam within a plane perpendicular to the direction in which the combined signal beam travels and that is input via the transmission path in the reverse direction of the change at the transmitting end, demultiplexing the multiplexed signal beam into the polarization combined signal lights different in wavelength, and separating the transmission signal light into the pair of signal lights, wherein a difference between the first variation frequency and the second variation frequency is set to be not greater than a response frequency based on abilities of demodulation in a digital processor which comprises a digital circuit that adaptively estimates a polarization property of the transmission path and demodulates the polarization combined signal lights.

10. An optical transmission system comprising:

a polarization coupler that combines a pair of signal lights having different polarization orientations to generate a transmission signal light;

a coupler that multiplexes polarization combined signal lights different in wavelength to generate a multiplexed signal beam, a polarization changer that continuously changes, at a first variation frequency, a state of polarization of the transmission signal light within a plane perpendicular to a direction in which the transmission signal light travels and outputs the transmission signal light to a transmission path;

a polarization reverse-changer that continuously changes, at a second variation frequency, the state of polarization of the transmission signal light input via the transmission path within a plane perpendicular to the direction in which the transmission signal light travels in the reverse direction of the change that the polarization changer applies;

a divider that demultiplexes the multiplexed signal beam after passing through the polarization reverse-changer into the polarization combined signal lights different in wavelength; and a polarization splitter that separates the transmission signal light into the pair of signal lights;

wherein a difference between the first variation frequency of the polarization changer and the second variation frequency of the polarization reverse-changer is set to be not greater than a response frequency based on abilities of demodulation in a digital processor which comprises a digital circuit that adaptively estimates a polarization property of the transmission path and demodulates the polarization combined signal lights demultiplexed in the divider.

* * * * *